US006379589B1

(12) United States Patent
Aldissi

(10) Patent No.: US 6,379,589 B1
(45) Date of Patent: Apr. 30, 2002

(54) SUPER-WIDE BAND SHIELDING MATERIALS

(75) Inventor: Mahmoud Aldissi, Belleair Beach, FL (US)

(73) Assignee: Fractal Systems Inc., Tampa, FL (US)

( * ) Notice: Subject to any disclaimer, the term of this patent is extended or adjusted under 35 U.S.C. 154(b) by 0 days.

(21) Appl. No.: 09/693,175

(22) Filed: Oct. 23, 2000

(51) Int. Cl.[7] .......................... H01B 1/20; B32B 15/04; C21D 1/04; G21F 1/10

(52) U.S. Cl. ....................... 252/500; 252/512; 428/375; 428/403; 148/108; 250/515.1

(58) Field of Search ................................ 252/500, 512; 428/375, 403, 922, 297; 148/108; 174/35 R; 250/515.1

(56) References Cited

U.S. PATENT DOCUMENTS 4,863,757 A * 9/1989 Durand ........................ 427/47
5,132,490 A * 7/1992 Aldissi ........................ 174/36
5,171,937 A * 12/1992 Aldissi ........................ 174/36
5,206,459 A * 4/1993 Aldissi ........................ 174/36
5,215,820 A * 6/1993 Hosokawa et al. ......... 428/403
5,225,110 A * 7/1993 Kathirgamanathan ....... 252/512
5,264,157 A * 11/1993 Bidan et al. ................ 252/519
5,938,979 A 8/1999 Kambe et al.
6,080,337 A 6/2000 Kambe et al.

* cited by examiner

*Primary Examiner*—Mark Kopec
(74) *Attorney, Agent, or Firm*—Salzman & Levy

(57) ABSTRACT

Shielding materials are fabricated from a new three-layered particle having a core, a metal layer, and a conductive polymer layer. The new particles are blended into a polymer matrix and processed in the absence or under the influence of a magnetic field to form single-layered coatings and freestanding films and sheets. The magnetically processed materials yield a conductive network of particles rather than discrete particles randomly disposed within the polymeric medium.

22 Claims, 4 Drawing Sheets

SUPER-WIDE BAND SHIELDING MATERIALS

FIELD OF THE INVENTION

The present invention relates to shielding materials and, more particularly, to a new, multi-layered particle of metal coated ferrites coated with a conductive polymer, and networked into a conductive polymer matrix to produce single-layered shielding coatings, films and sheets having a tailored application in sophisticated electronics and military hardware.

BACKGROUND OF THE INVENTION

Sophisticated electronics, particularly those employing high frequencies and military hardware using space-age composites, require electromagnetic radiation hardening. Survivability countermeasures use shielding against nuclear, laser, EMI and radar/microwave radiation. Several hardening methods exist. The choice of which techniques to use depends on the frequency range and the type of the electromagnetic threat. Surface metallization, use of conductive composites, and metallic enclosures, are but a few of the shielding techniques employed. Each method has its own shortcomings, and the materials used are often expensive.

It is not uncommon to observe shielding failures in composites resulting from radiation transparent spots, phase separations, and cracking. Coating imperfections, corrosion in metallized components, scratches, and feed-through holes in metallic enclosures, represent additional shielding failure problems.

No single material satisfies shielding requirements for a wide range of frequencies; therefore, several materials and methods are employed in order to achieve a desired absorption. Materials whose composite layers have different functions are currently used. These materials are expensive and inefficient, and their composite layers add weight to the assembly. The weight drawback is particularly anathema to military, aeronautical, and space objectives.

Blends of different materials have been made to satisfy the shielding requirements for use in a wide frequency range. However, each material in the blend is diluted by virtue of its inclusion, thus weakening the original properties.

Manufacturers and suppliers have developed a number of electrically conductive compounds that incorporate conductive fillers. They have also provided techniques for coating molded plastic surfaces with metals including copper, silver, nickel and their alloys. The incorporation of conductive particles in an insulating matrix requires that the amount of particles be higher than the percolation threshold concentration. The same rule must be applied when adding a second conductive component with different EM absorption, dissipation, or reflection characteristics.

The complexities of the shielding problem are further exacerbated by continually changing specifications that demand ever higher levels of shielding protection. ASTM Committee D9 has developed and issued a new standard for testing shielding effectiveness (SE): ASTM ES 7-83. Also a new edition of IEC 60601-1-2, Collateral Standards of EMC Requirements and Tests of Medical Electrical Equipment, is currently being debated.

The use of polymeric materials having high conductivity has also been explored in radiation hardening applications. The polymeric materials are often combined with other shielding materials. The conductive polymeric materials can be used over a wide frequency spectrum, owing to their interesting electromagnetic characteristics. Conductive polymeric materials include the class of doped conjugated polymers such as polypyrroles, polyanilines, polythiophenes, poly(3,4-ethylenedioxythiophene), polyphenylenes and polypheneylene vinylenes and derivatives thereof.

Their use in EMI applications is strongly dependent on their conductivity and permeability. High dielectric constants, derived from their dynamic conductivity, make the conductive polymers ideal for microwave hardening and radar absorption applications.

Conductive polymers are typically synthesized using well known procedures. They usually have high molecular weight. They are electron-rich due to their conjugated backbone and their ability to give or accept electrons. Although these polymers have metallic conductivity, conduction is driven by a different mechanism from that governing metals, or inorganic semiconductors. In metals, electrons move by hopping, while in most known conductive polymers, the charge carriers are polarons and bipolarons. These electronic states correspond to energy levels within the band gap, thus making them intrinsically conductive. Therefore, the frequency dependence of their conductivity and their dielectric constant is different from those of metals.

DESCRIPTION OF PRIOR ART

U.S. Pat. Nos. 5,938,979 and 6,080,337, both for ELECTROMAGNETIC SHIELDING, issued Aug. 17, 1999 and Jun. 27, 2000, respectively, to Kambe et al., teach electromagnetic shielding material formed from a shielding composition made with magnetic particles and a binder. The magnetic particles have an average diameter less than about 1000 nm and are substantially crystalline. The magnetic particles can be formed from $Fe_2O_3$, $Fe_2O_4$, $Fe_3C$, or $Fe_7C_3$. The shielding composition can be formed into a layer or into composite particles. The binder can be a metal or an electrically conducting polymer. A conducting layer can be placed adjacent to the shielding composition.

The present invention reflects the use of new shielding materials using a novel, three-layered particle. The particle is a conductive polymer disposed over a metal-coated, ferromagnetic particle to form the three-layered, conductive, ferromagnetic particle. The new, three-layered particle is blended into a polymer matrix and processed in a magnetic field to form single-layered coatings and freestanding films and sheets. The blends are magnetically processed, such that a conductive network of particles is obtained within the polymer matrix, rather than having discrete particles disposed within a medium. The preferred metal layer of the particle comprises nickel, because of its ferromagnetic and conductive properties. The metal layer also comprises other ferromagnetic and non-ferromagnetic metals such as silver, manganese, aluminum, magnesium and zinc. A typical conductive polymer coating and matrix material can comprise polypyrroles, polythiophenes, polyanilines and other similar materials from the class of intrinsically conductive polymers.

Radar uses electromagnetic waves that bounce off of a particular target, and are collected by a receiver that analyzes the reflected signal. The range, direction and speed of the object is then determined. Reflections occur whenever there is a sharp impedance difference between the medium (usually air) and the object. Metals tend to re-radiate or reflect the incoming signal. Conductive polymers as radar absorbers in antennas, Salisbury screens, camouflage, and other types of shielding are of interest to the military.

Conductive polymer camouflage reflects back differently form the object it covers. It absorbs microwave radiation, because it has more continuously variable impedance. A conductive polymer textile used for camouflage has no sharp edges, or wings, and tends to appear indistinguishable form its surroundings. Microwave (100 MHz–12 GHz) properties of conductive polymer fabrics have been studied.

Stealth aircraft could benefit from the inventive materials. The metallic aircraft surface is a reflector with respect to EM waves. That is why for twenty years much work has been devoted in the U.S., Europe and former USSR to the concept of radar absorbing materials (RAM) associated with an optimized shape of the aircraft.

However, all of the above work, apart from the camouflaging textiles and shielded cables, use synthesized polymers with no variation in characteristics or parameters for their intended applications.

The new particles and their novel films and sheets provide the following novelties and advantages, heretofore unknown in the art:

1. High permeability ferrites coated with a ferromagnetic metal, and an inherently conductive polymer with high conductivity and interesting dielectric properties is combined into one single particle. For purposes of this disclosure, the term "ferrites" is meant to include magnetite.
2. Conductivity and frequency response of the fabricated materials can be tailored for specific products.
3. The conductive polymer layer of the novel particles is used both as a shielding material and as a plasticizer/binder. The conductive polymer comprises any polymer from the class of intrinsically conductive polymers.
4. Lightweight shields can be formed due to the low percolation threshold.
5. The shields fabricated from the novel films and sheets can be repaired easily in the field, if they are physically damaged.
6. The synthesized materials are inexpensive, and are easily fabricated using straightforward, state of the art, synthesis techniques.

SUMMARY OF THE INVENTION

In accordance with the present invention, there are provided new shielding materials using a novel particle. The particle is a conductive polymer disposed over a metal-coated, ferromagnetic particle to form a three-layered, conductive, ferromagnetic particle. The new three-layered particle is blended into a polymer matrix and processed in a magnetic field or without a magnetic field to form single-layered coatings and freestanding films and sheets. The blends are magnetically processed, such that a conductive network of particles in the matrix is obtained, rather than discrete particles disposed within a medium. The ferrite particle is coated with the metal layer. Then the particles are blended in a conductive polythiophene derivative which is in solution or dispersion form. The can also be coated electrochemically with an intrinsically conductive polymer such as polypyrrole or polythiophene. The polymer is rendered conductive by virtue of the doping process, the dopant being molecular such as toluene sulfonate or polymeric such as polystyrenesulfonate. Nickel is the preferred metal for the metal coating of the particles, because of its ferromagnetic and conductive properties. However, other metals such as silver, manganese, aluminum, magnesium and zinc work as well. A typical conductive polymer coating and matrix can comprise polypyrroles, polythiophenes and similar intrinsically conductive polymers.

It is an object of this invention to provide improved shielding materials having wide applicability in space, aeronautics, and military applications.

It is another object of the invention to provide improved shielding materials having low weight and low cost.

It is a further object of this invention to provide improved shielding materials having applicability over a wide frequency range, and which can be tailored to a specific application.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention features shielding materials fabricated from a new, three-layered particle. The new particles are blended into a polymer matrix and processed in a magnetic field to form single, layered coatings and freestanding films and sheets. The blends are processed in the absence or in the presence of a magnetic field. The latter yields a conductive network of particles rather than discrete particles randomly distributed in the polymeric medium.

Figure 1:
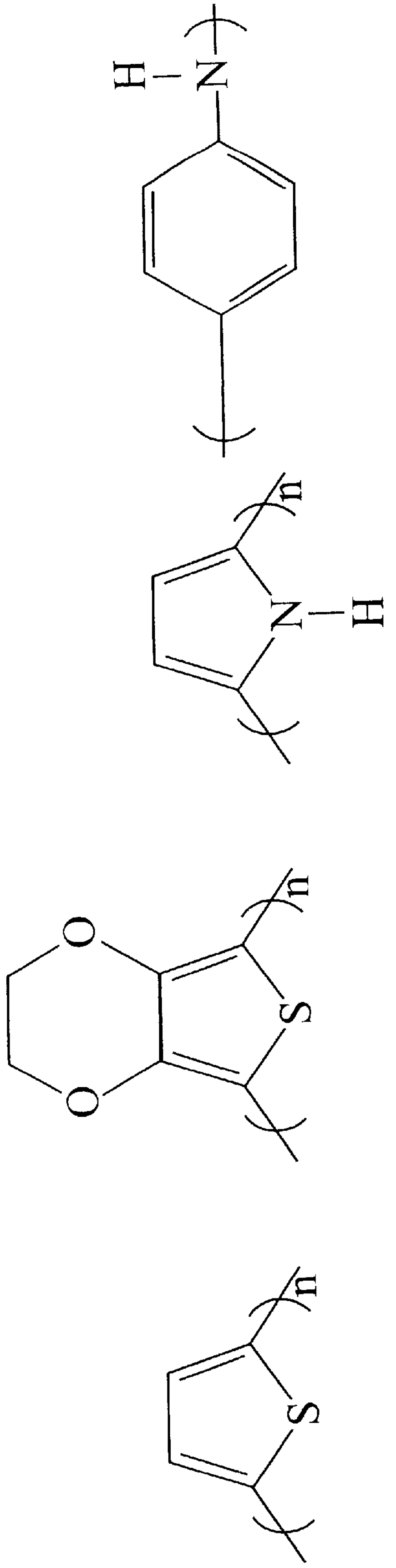
FIG. 1 illustrates a diagram of the chemical structure of several conductive polymers useful in making shielding materials in accordance with this invention.

Now referring to FIG. 1, there is shown a diagram of the chemical structure of several conductive polymers useful in making shielding materials in accordance with this invention. Conductive polymeric materials include the class of doped conjugated polymers such as the ones listed, polyphenylenes and polypheneylene vinylenes and derivatives thereof. These polymers cannot perform alone in an acceptable frequency range.

Ten years ago, only potential applications in the field of EMI shielding were presented for conductive polymers, and some data on microwave characterization of different conductive polymers were obtained. In parallel with this work, dielectric and conductivity relaxation models were developed and applied to some of these polymers. Direct application of microwave properties of polyaniline consisted of its use only in microwave welding. EMI shielding properties were examined for polyaniline blends, and reasonably good results were obtained. Other than EMI shielding, which needs high conductivity, relatively little information was available concerning microwave absorption for stealth technology. Only a few published articles pertained to conductive polymers used for shielding aircraft.

More recently, the present inventor has developed conductive polymer applications in EMI, radar and microwave frequency ranges. This development included shielding materials such as cables, connectors, gaskets and planar shielding applications. The two advantages of the developed materials were their speed and EM noise reduction. Such materials have proved to be useful in radiation absorption in a wide frequency range due to their conductive and ferromagnetic components.

Extruded sheets (175 $\mu$m-thick) of polyaniline/PVC composites, polypyrrole films (30 $\mu$m-thick), and polypyrrole-coated glass fabrics, provided by Milliken Research Corp (polypyrrole coating was approximately 1 $\mu$m thick) in planar shield and gasket far-field measurement setups were tested in the range of 30 Mhz to 10 GHz.

Shielding effectiveness of a polyaniline/PVC blend equal to 0.5 S/cm was examined on cables. A 7 mil-thick layer was extruded on an RG 58 cable shielded with a metal braid (92% optical coverage). Surface transfer impedance ($Z_T$) was measured before and after extrusion. Shielding up to 5 MHz was provided by the metal braid. Above 5 MHz, shielding was enhanced due to the conductive polymer with an extrapolated ratio of approximately 30 times improvement at 1 GHz.

Furthermore, the resonance observed in the braided cable became minimal, when the conductive polymer was used, due to "field smoothing". The conductive polymers were shown to be useful in complementary shielding applications, as well as for stand-alone shielding materials.

Figure 2:
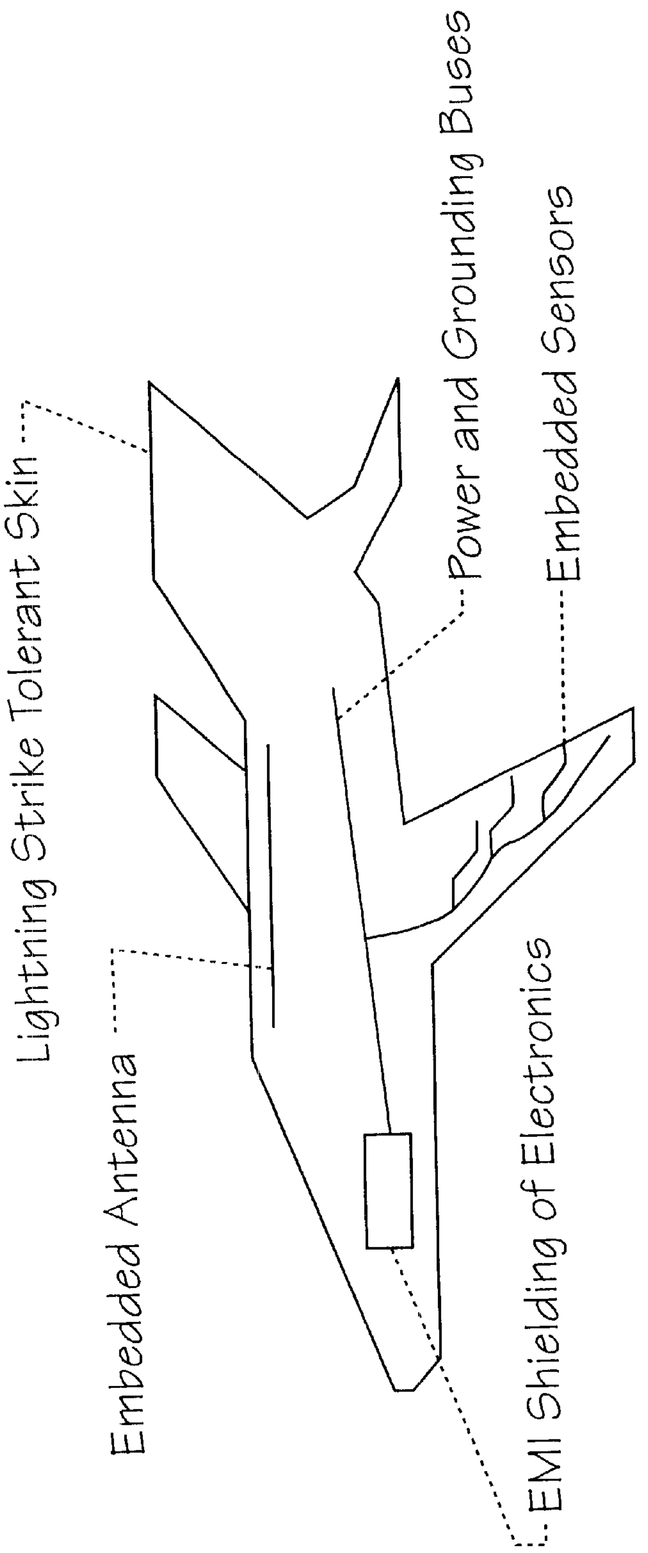
FIG. 2 depicts a diagram of aeronautical uses for the conductive polymers displayed in FIG. 1.

Referring to FIG. 2, a schematic diagram is shown of the potential uses of the present invention in stealth applications. The present invention tailors the conductivity and the electromagnetic characteristics of the polymers to specific applications over a wide frequency spectrum. Thus, the invention provides a means by which conductive polymers can satisfy a host of applications.

Figure 3:
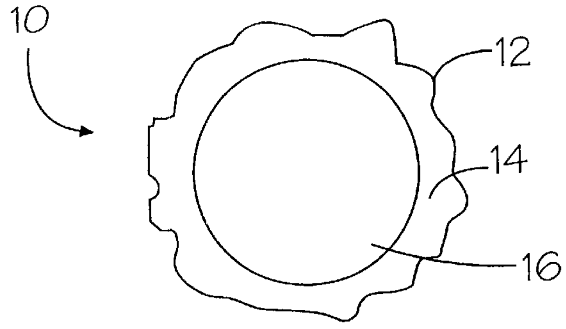
FIG. 3 shows a sectional view of a schematic representation of the three-layered particle fabricated in accordance with this invention.

Referring to FIG. 3, a sectional schematic of the novel particle 10 of this invention is shown. The particle 10 comprises an outer layer 12 of an inherently conductive polymer, an intermediate metal layer 14, and a ferromagnetic core 16. The three layers 12, 14, 16 of the particle 10 have been fashioned into a single particle. The particle 10 is then introduced into a matrix (not shown here), and is magnetically processed to provide a low threshold percolation. The resulting product has good EM characteristics in a wide frequency range.

Figure 4A:
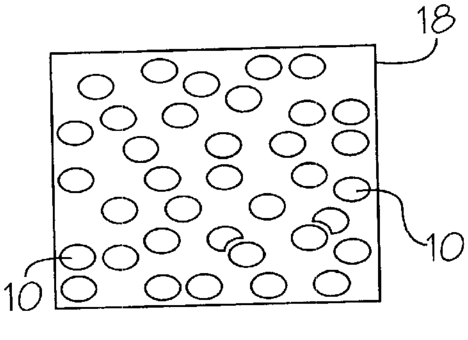
FIG. 4*a* illustrates a schematic diagram of magnetic particles distributed randomly with conventional percolation.
Figure 4B:
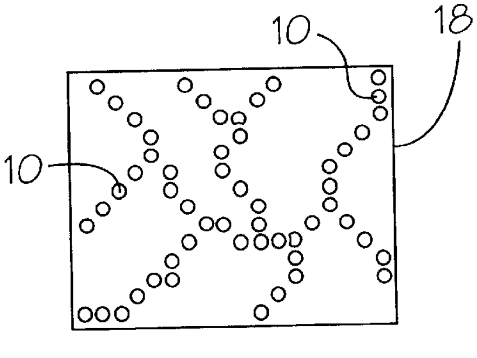
FIG. 4*b* depicts a schematic diagram of magnetic particles distributed in a matrix that have been processed with a magnetic field in accordance with the invention.

More particularly, in a preferred embodiment, the three components of particle 10 comprise a) core 16 of a mixed-geometry ferrite particle; b) a thin metal layer 14 comprising a coating of nickel (1–5 weight % of the ferrite particle) silver, aluminum, zinc, manganese or any one of a large variety of metals that can be deposited using the same process; and c) a thin outer layer 12 (a few $\mu$m thick) of a conducting polymer, which forms the conductive glue for the inorganic particles within a polymer matrix, as further explained hereinafter, with respect to FIGS. 4*a* and 4*b*. The thickness of the nickel layer 14 and polymer layer 12 are chosen such that bulk absorption properties of the ferromagnetic component 16 are not affected. The choice of nickel is due to its ferromagnetic and conductive properties. Polypyrrole can be used for the conductive polymer layer 12, due to its process compatibility.

The spherical shape of the core particle 16 is shown in FIG. 3 for simplicity, but does not reflect the actual shape of ferromagnetic particles. The nickel coating layer 14 can be applied to core 16 by electrochemical procedures known in the art. The same procedure can be used to coat the conductive polymer layer 12 onto the metallized, ferromagnetic particles.

The particles 10 are then blended into a matrix of conductive polymer 18 in such a way that a conductive network is achieved in the matrix (FIG. 4*b*). This is in comparison with randomly placed, discrete particles, as shown in the comparison FIG. 4*a*. The network of particles is achieved in the polymer blend by molding the particles in the matrix under the influence of a magnetic field. The magnetic field is provided by an electromagnet with variable distance between the poles. In addition to influence of the magnetic field, the conductive polymer has the tendency to form networks due to its polar dopant molecules. The conductive polymer layer 18 acts as a plasticizer in addition to providing conductivity. The type of network produced by the magnetizing process allows the fabrication of high conductivity blends, at a lower percolation ($fp$) threshold, than in conventional materials.

Figure 5:
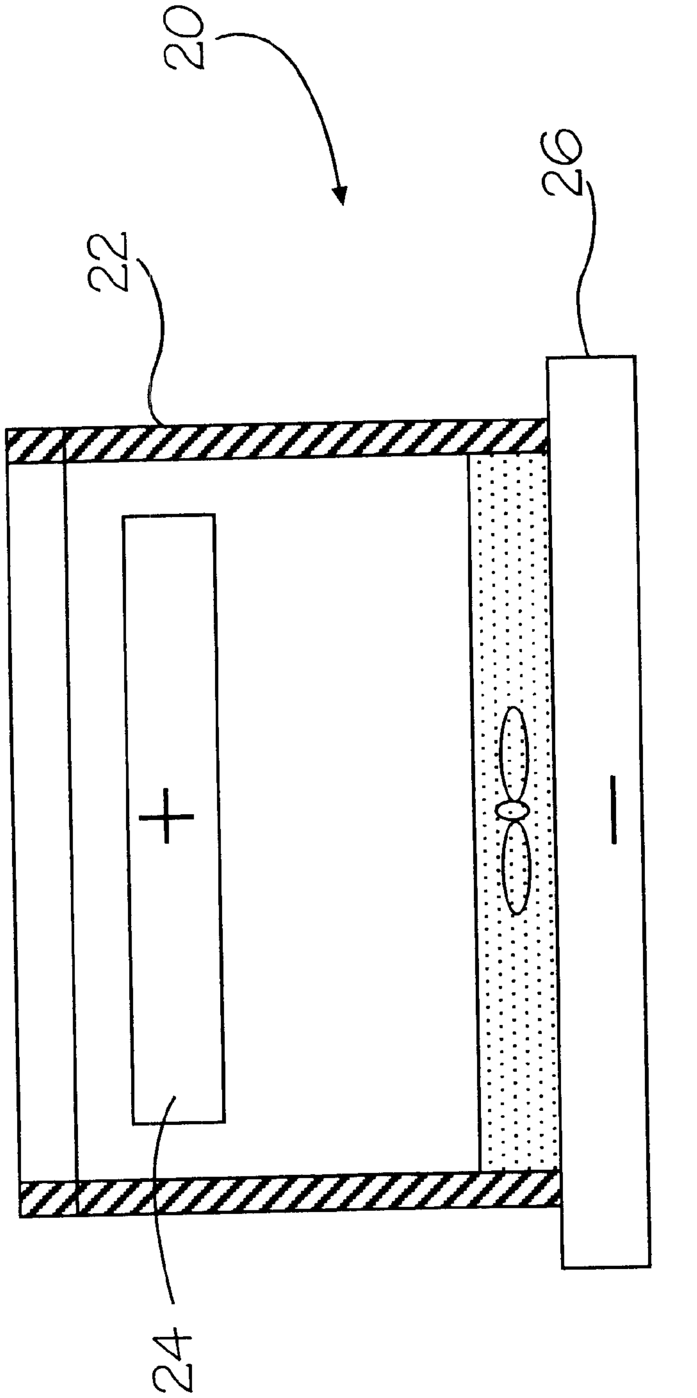
FIG. 5 is a schematic diagram of an electrochemical coating apparatus for synthesizing the three-layered particle depicted in FIG. 3.

Referring to FIG. 5, an apparatus 20 is shown for electrochemically coating nickel 14 onto the core 16 of the particle 10, illustrated in FIG. 3. The apparatus 20 consists of a rectangular glass container 22 having an anode comprising a nickel plate 24, and a cathode of an aluminum or stainless steel plate 26. The ferrite particle core 16, with high initial permeability, $\mu^i$=5000 to 10,000, and an average diameter of 1 to 10 $\mu$m is used in this process and is available from Steward Mfg. Co. and other ferrite manufacturers. The particles chosen have an irregular variable shape that includes spherical and rod-like geometries known to lower the percolation threshold in composites. An aqueous nickel precursor solution is mixed with the ferrite particles to form a slurry in direct contact with the cathode plate 26. Several short (few tens of seconds) stirring and electrodeposition cycles are performed to achieve the desired coating thickness using an applied DC voltage of 9 V. The coated particles are washed with water several times and then rinsed with methanol. The washed particles are then dried in a vacuum oven.

The coated particles are then placed back into apparatus 20, in order to apply the outer polymer coat 12. An organic electrolyte in acetonitrile, which contains a pyrrole monomer, is used for the outer layer 12. The polarity is reversed compared to the nickel coating procedure, because of the anodic oxidation nature of conductive polymers. A similar stirring and electrodeposition procedure is used, except that the voltages needed (≈1.5 V vs. Ag/AgCl reference electrode) are lower than for nickel deposition. The resulting material is washed several times with acetonitrile, then dried in a vacuum oven at 60° C.

The ferrite particle is coated with the metal layer. Then the particles are blended in a conductive polythiophene derivative which is in solution. The polymer is rendered conductive by virtue of the doping process, the dopant being molecular such as toluene sulfonate or polymeric such as polystyrenesulfonate. Because of the nature of the dopant, a polymeric matrix is already present for binding with the metal-coated ferrite particles.

The three-layered particles 10 can be characterized using Scanning and Transmission Electron Microscopy (SEM, TEM) to ensure formation of the nickel and conductive polymer layers on the particles. With SEM, the overall particle shape and size can be observed as a result of the coating process. TEM is a useful tool to observe the particle coverage by the conductive polymer layer. The material density is also measured, since this parameter is necessary for blending the particle in the polymer matrix.

As mentioned herein above, the conductive polymer can consist of polypyrrole doped with dodecylbenzene sulfonate, for example, which acts as a conductive plasticizer via a sulfonate group. However, to ensure a good dispersion within the polymer matrix, the three-layered particles 10 are dispersed in an excess of isopropanol, containing 1 wt.% (relative to that of the particles) of a titanate interfacial modifier (LICA 38) available from Ken-React. The role of the interfacial modifier is to wet the particle surface where needed, so that efficient dispersion occurs.

After stirring for 30 minutes, the particles are allowed to precipitate, are separated from the solvent, and then dried in a vacuum oven. The treated particles are then added to a solvent mixture of n-propanol/toluene/isopropyl acetate (6:1:3) such that the particle/polymer ratio is known. The dispersion is then poured onto a non-magnetic metal substrate, contoured with a gasket to contain the necessary dispersion volume and with a thermocouple for heating purposes. Prior to complete removal of the solvent, the loaded substrate is placed between magnet poles and heated in the magnetic field.

In another process embodiment, the particles are blended with the polymer matrix in a blender in the dry state. A magnetic field orients the particles in the soft or molten state of the polymer. Films or sheets of sufficient thickness are made for EM absorption measurements. As aforementioned, a thin layer of nickel ($\approx$0.25 $\mu$m) can be applied to the magnetically oriented materials, using electroplating or dip-coating to enhance the effectiveness of the shielding.

EXAMPLE I

Using the procedures described above, manganese zinc ferrite powder, obtained from the Steward Mfg. Co., is coated with a layer of nickel by the described electrochemical method. The average particle diameter is 20 $\mu$m. The layer consists of 1.5% by weight of the ferrite particle, and has a thickness of 25 nanometers. The nickel coated particles are electrochemically coated with polypyrrole, such that the conductive polymer layer makes 1% by weight of the particle. This layer has a thickness of approximately 0.5 $\mu$m. The bulk conductivity is approximately 100 S/cm, and shielding effectiveness is 60 dB at 1 GHz.

EXAMPLE II

The nickel and conductive polymer layers of the shielding material of Example I is formed using electroless plating and oxidative polymerization, respectively.

EXAMPLE III

The same material as Example I is formed, with the exception that the nickel layer is 3 weight percent, and 50 nanometers thick.

EXAMPLE IV

The same material as Example III, except that the conductive polymer layer is two weight percent, and has a thickness of 1 $\mu$m. Bulk conductivity is 150 S/cm, and shielding effectiveness is 82 dB at 1 GHz.

References

1. A. J. Epstein et al. in “Intrinsically Conduction Polymers: an Emerging Technology”, Ed. M. Aldissi, p. 165 (1993), Kluwer Academic Publishers, Dordrecht, The Netherlands.

2. L. W. Shacklette and N. F. Colaneri, IEEE Instrumentation and Measurement Technology Conf., Atlanta, Ga., May 14–16, 1991.

3. M. Aldissi, “Metal-Coated Shielding Materials and Articles Fabricated Therefrom”, U.S. Pat. No. 5,171,937.

4. M. Aldissi, “Shielded Wire and Cable”, U.S. Pat. No. 5,180,884.

5. M. Aldissi, “Conductive Polymeric Shielding Materials Using Shaped Ferrites”, U.S. Pat. No. 5,206,459.

6. M. Aldissi, “Polymeric Electromagnetic Fluids”, U.S. patent application Ser. No. 07/933,554 now abandoned.

7. M. Aldissi, “Electromagnetic Bonding Materials”, U.S. patent application Ser. No. 07/968,126 now abandoned.

8. M. Aldissi, EMC Magazine, p. 33 (1992).

9. M. Aldissi, “Conductive Polymer Shielded Wire and Cable”, U.S. Pat. No. 5,132,490.

10. A. D. Child and H. H. Kuhn, Am. Chem. Soc. Polym. Prepr. 35(1) (1994) 249.

11. M. Aldissi and S. P. Armes, “Colloidal Dispersions of Conducting Polymers”, Prog. in Org. Coat. 19(1) (1990) 59.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A three-layered shielding particle, comprising:

a core comprising a ferromagnetic particle;

a metal layer coated over said core; and a conductive polymer coated over said metal layer.

2. The three-layered shielding particle in accordance with claim 1, wherein said ferromagnetic particle is a ferrite.

3. The three-layered shielding particle in accordance with claim 2, wherein said ferromagnetic particle is a manganese zinc ferrite.

4. The three-layered shielding particle in accordance with claim 1, wherein said metal layer comprises nickel.

5. The three-layered shielding particle in accordance with claim 4, wherein said nickel layer comprises between approximately 0.1% to 10% by weight of the ferromagnetic particle.

6. The three-layered shielding particle in accordance with claim 1, wherein said metal layer comprises nickel in a thickness greater than or equal to 250 angstroms.

7. The three-layered shielding particle in accordance with claim 1, wherein said polymer layer comprises polypyrrole.

8. The three-layered shielding particle in accordance with claim 7, wherein said polypyrrole polymer layer comprises between approximately 0.5% to 10% by weight of the ferromagnetic particle.

9. A shielding coating, film or sheet, comprising a network of three-layered particles disposed in a conductive polymer matrix, each of said three-layered particles comprising: a core comprising a ferromagnetic particle; a metal layer coated over said core; and a conductive polymer coated over said metal layer, and wherein said three-layered particles are formed within said conductive polymer matrix under a magnetic field to provide a network of particles.

10. The shielding coating, film or sheet in accordance with claim 9, wherein said ferromagnetic particle is a ferrite.

11. The shielding coating, film or sheet in accordance with claim 10, wherein said ferromagnetic particle is a manganese zinc ferrite.

12. The shielding coating, film or sheet in accordance with claim 9, wherein said metal layer comprises nickel.

13. The shielding coating, film or sheet in accordance with claim 12, wherein said nickel layer comprises between approximately 1.5% to 3.0% by weight of the ferromagnetic particle.

14. The shielding coating, film or sheet in accordance with claim 9, wherein said metal layer comprises nickel in an approximate thickness greater than or equal to 250 angstroms.

15. The shielding coating, film or sheet in accordance with claim 9, wherein said polymer layer comprises any of the intrinsically conductive polymers.

16. The shielding film or sheet in accordance with claim 15, wherein said intrinsically conductive polymer layer comprises between approximately 1.0% to 2.0% by weight of the ferromagnetic particle.

17. A method of fabricating shielding materials, comprising the steps of:

a) coating individual ferromagnetic particles each with a metal layer;

b) coating said metal layered ferromagnetic particles of step (a) with a conductive polymer layer to form a three-layered shielding particle; and c) forming a network of said three-layered shielding particles of step (b) in a conductive or non-conductive matrix.

18. The method of fabricating shielding materials in accordance with claim 17, wherein said forming step (c) comprises introducing said three-layered shielding particles into said conductive polymer matrix.

19. The method of fabricating shielding materials in accordance with claim 18, wherein said introduction of said 3-layered shielding particles into said conductive polymer matrix is performed under a magnetic field.

20. The method of fabricating shielding materials in accordance with claim 18, wherein said introduction of said 3-layered shielding particles into said conductive polymer matrix is performed without a magnetic field.

21. The method of fabricating shielding materials in accordance with claim 18, wherein said conductive polymer of step (b) is of the class of intrinsically conductive polymers doped with molecular or polymeric dopants.

22. The method of fabricating shielding materials in accordance with claim 19, wherein said conductive polymer of step (b) is of the class of intrinsically conductive polymers doped with molecular or polymeric dopants.

* * * * *